US011579951B2

(12) United States Patent
Kocberber et al.

(10) Patent No.: US 11,579,951 B2
(45) Date of Patent: Feb. 14, 2023

(54) DISK DRIVE FAILURE PREDICTION WITH NEURAL NETWORKS

(71) Applicant: Oracle International Corporation, Redwood Shores, CA (US)

(72) Inventors: Onur Kocberber, Baden-Daettwil (CH); Felix Schmidt, Baden-Daettwil (CH); Arun Raghavan, Belmont, CA (US); Nipun Agarwal, Saratoga, CA (US); Sam Idicula, Santa Clara, CA (US); Guang-Tong Zhou, Vancouver (CA); Nitin Kunal, Zurich (CH)

(73) Assignee: Oracle International Corporation, Redwood Shores, CA (US)

( * ) Notice: Subject to any disclaimer, the term of this patent is extended or adjusted under 35 U.S.C. 154(b) by 1108 days.

(21) Appl. No.: 16/144,912

(22) Filed: Sep. 27, 2018

(65) Prior Publication Data

US 2020/0104200 A1 Apr. 2, 2020

(51) Int. Cl.
*G06F 11/00* (2006.01)
*G06N 20/00* (2019.01)
(Continued)

(52) U.S. Cl.
CPC ........ *G06F 11/008* (2013.01); *G06F 11/2263* (2013.01); *G06F 11/3034* (2013.01);
(Continued)

(58) Field of Classification Search
CPC ............... G06F 11/008; G06F 11/2263; G06F 11/3034; G06F 17/18; G06K 9/6256;
(Continued)

(56) References Cited

U.S. PATENT DOCUMENTS 9,009,687 B2 4/2015 Caira
9,311,248 B2 4/2016 Wagner
(Continued)

FOREIGN PATENT DOCUMENTS

CN 107 769 972 A 3/2018
CN 108712292 A 10/2018

OTHER PUBLICATIONS

Peinador, U.S. Appl. No. 16/122,398, filed Sep. 5, 2018, Office Action, dated Oct. 28, 2020.
(Continued)

*Primary Examiner* — Ruiping Li
(74) *Attorney, Agent, or Firm* — Hickman Becker Bingham Ledesma LLP

(57) ABSTRACT

Techniques are described herein for predicting disk drive failure using a machine learning model. The framework involves receiving disk drive sensor attributes as training data, preprocessing the training data to select a set of enhanced feature sequences, and using the enhanced feature sequences to train a machine learning model to predict disk drive failures from disk drive sensor monitoring data. Prior to the training phase, the RNN LSTM model is tuned using a set of predefined hyper-parameters. The preprocessing, which is performed during the training and evaluation phase as well as later during the prediction phase, involves using predefined values for a set of parameters to generate the set of enhanced sequences from raw sensor reading. The enhanced feature sequences are generated to maintain a desired healthy/failed disk ratio, and only use samples leading up to a last-valid-time sample in order to honor a pre-specified heads-up-period alert requirement.

20 Claims, 9 Drawing Sheets

(51) Int. Cl.
   *G06F 11/30* (2006.01)
   *G06F 17/18* (2006.01)
   *G06K 9/62* (2022.01)
   *G06N 3/08* (2006.01)
   *G06F 11/22* (2006.01)

(52) U.S. Cl.
   CPC ............ *G06F 17/18* (2013.01); *G06K 9/6256* (2013.01); *G06N 3/08* (2013.01); *G06N 20/00* (2019.01)

(58) Field of Classification Search
   CPC ........ G06N 20/00; G06N 3/0445; G06N 3/08; G06N 3/082; G06N 3/084
   See application file for complete search history.

(56) References Cited

U.S. PATENT DOCUMENTS

| | | |
|---|---|---|
| 9,729,312 B2 | 8/2017 | Bathen |
| 9,760,395 B2 | 9/2017 | Doherty et al. |
| 9,785,492 B1 | 10/2017 | Neumann et al. |
| 10,216,558 B1* | 2/2019 | Gaber ................. G06F 11/0727 |
| 10,726,930 B2* | 7/2020 | Sarkar ................. G11C 16/349 |
| 11,310,247 B2 | 4/2022 | Manadhata et al. |
| 2002/0169735 A1 | 11/2002 | Kil et al. |
| 2003/0200134 A1 | 10/2003 | Leonard et al. |
| 2007/0168498 A1 | 7/2007 | Lambert et al. |
| 2007/0294736 A1 | 12/2007 | Brady et al. |
| 2014/0101117 A1 | 4/2014 | Uzzaman |
| 2015/0287057 A1 | 10/2015 | Baughman et al. |
| 2016/0028599 A1 | 1/2016 | Vasseur et al. |
| 2017/0193395 A1 | 7/2017 | Limonad et al. |
| 2017/0372232 A1 | 12/2017 | Maughan et al. |
| 2018/0022539 A1 | 1/2018 | Vedani |
| 2018/0027063 A1 | 1/2018 | Nachimuthu et al. |
| 2018/0034966 A1 | 2/2018 | te Booij et al. |
| 2018/0046926 A1 | 2/2018 | Achin et al. |
| 2018/0060211 A1 | 3/2018 | Allen |
| 2018/0060220 A1 | 3/2018 | Yao |
| 2018/0097744 A1 | 4/2018 | Hu et al. |
| 2018/0191758 A1 | 7/2018 | Abbaszadeh et al. |
| 2018/0225391 A1 | 8/2018 | Sali et al. |
| 2018/0365581 A1 | 12/2018 | Vasseur et al. |
| 2019/0018614 A1 | 1/2019 | Balko |
| 2019/0094286 A1 | 3/2019 | Becher et al. |
| 2019/0392255 A1 | 12/2019 | Franklin |
| 2020/0045049 A1 | 2/2020 | Apostolopoulos |
| 2020/0076840 A1 | 3/2020 | Peinador |
| 2020/0082013 A1 | 3/2020 | Triplet et al. |
| 2020/0118039 A1 | 4/2020 | Kocberber et al. |
| 2020/0134423 A1 | 4/2020 | Shinde |
| 2020/0342265 A1 | 10/2020 | Cai |
| 2021/0089927 A9 | 3/2021 | Ryan et al. |
| 2021/0287136 A1 | 9/2021 | Das |
| 2022/0121955 A1 | 4/2022 | Chavoshi et al. |
| 2022/0222931 A1 | 7/2022 | Goyal |

OTHER PUBLICATIONS

Perozzi et al., "DeepWalk: Online Learning of Social Representations", dated 2014, 10 pages.
Ding et al., "PCA-Based Network Traffic Anomaly Detection" Tsinghua Science and Technology, vol. 21, No. 5, Oct. 2016, 10 pages.
Garcia-Duran et al. "Learning Graph Representations with Embedding Propagation", 31st Conference on Neural Information Processing Systems (NIPS 2017), 12 pages.
Gibert et al., "Graph Embedding in Vector Spaces", GbR'2011 Mini-tutorial, dated 2011, 66 pages.
Grover et al., "node2vec: Scalable Feature Learning for Networks", KDD '16, Aug. 13-17, 2016, San Francisco, CA, USA, 10 pages.
Hamilton et al., "Inductive Representation Learning on Large Graphs", 31st Conference on Neural Information Processing Systems (NIPS 2017), Long Beach, CA, USA, 11 pages.
Hamilton et al., "Representation Learning on Graphs: Methods and Applications", Copyright 2017 IEEE, 24 pages.
Bengio et al., "Learning Deep Architectures for AI", dated 2009, 71 pages.
Maglaras et al. "A real time OCSVM Intrusion Detection module with low overhead for SCADA systems", International Journal of Advanced Research in Artificial Intelligence, vol. 3, No. 10, 2014, 9 pgs.
Zhang et al., "Automated IT System Failure Prediction: A Deep Learning Approach", dated 2016, 11 pages.
Scholkopf et al. "Estimating the Support of a High-Dimensional Distribution", dated Nov. 27, 1999, 28 pages.
Wei et al., "Graph embedding based feature selection", Neurocomputing 93 dated May 17, 2012, 11 pages.
Xu et al. "Detecting Large-Scale System Problem by Mining Console Logs", SOSP'09, Oct. 11-14, 2009, 15 pages.
Yamanishi et al., "Dynamic Syslog Mining for Network Failure Monitoring", KDD'05 Aug. 21-24, 2005, Chicago, Illinois, USA, 10 pages.
Yen et al., "Beehive: Large-Scale Log Analysis for Detecting Suspicious Activity in Enterprise Networks", ACSAC '13 dated Dec. 9-13, 2013, New Orleans, Louisiana, USA, 10 pages.
Zhang et al, "Network Anomaly Detection Using One Class Support Vector Machine", Proceedings of the International MultiConference of Engineers and Computer Scientists 2008 vol. 1, Mar. 19, 2008, 5 pages.
Liu et al., "Isolation Forest", dated 2008, 10 pages.
Wang et al., "Experimental comparison of representation methods and distance measures for time series data", dated Feb. 12, 2010, 35 pages.
Song et al., "Deep r -th Root of Rank Supervised Joint Binary Embedding for Multivariate Time Series Retrieval", KDD 2018, dated Aug. 19, 2023, 2018, London, United Kingdom, 10 pages.
Schoenfeld et al., "Preprocessor Selection for Machine Learning Pipelines", dated 2018, 7 pages.
Plotz et al., "Feature Learning for Activity Recognition in Ubiquitous Computing", dated Jan. 2011, 7 pages.
Paoli et al., "Forecasting of preprocessed daily solar radiation time series using neural networks", Solar Energy, Elsevier, dated 2010, 43 pages.
Ng, "Data preprocessing for machine learning: options and recommendations", dated Jun. 22, 2020, 12 pages.
Lin et al., "Experiencing SAX: a novel symbolic representation of time series", dated Apr. 3, 2007, 38 pages.
Faloutsos et al., "Fast Subsequence Matching in Time Series Databases", dated 1998, 11 pages.
Camerra et al., "Beyond one billion time series: indexing and mining very large time series collections with iSAX2+", dated Feb. 16, 2013, 29 pages.
Brownlee, Jason, "Time Series Forecasting as Supervised Learning", dated Aug. 21, 2019, 2 pages.
Artificial Intelligence Blog, "Announcing automated ML capability in Azure Machine Learning", dated Sep. 24, 2018, 8 pages.
Amazon SageMaker, "DeepAR Forecasting Algorithm", https://docs.aws.amazon.com/sagemaker/latest/dg/deepar.html,last viewed on Jun. 29, 2020, 5 pages.
Ahmed et al., "An Empirical Comparison of Machine Learning Models for Time Series Forecasting", dated Sep. 15, 2010, 31 pages.
Abe et al., "Developing an Integrated Time-Series Data Mining Environment for Medical Data Mining", Seventh IEEE International Conference on Data Mining—Workshops, dated 2007, 6 pages.
"Machine Learning Approaches for Time Series Data" dated May 19, 2019, 25 pages.
An et al., "Variational Autoencoder based Anomaly Detection Using Reconstruction Probability", 2015-2 Special Lecture on IE, dated Dec. 27, 2015, 18 pages.
Talagala et al., "Meta-Learning How to Forecast Time Series", Department of Econometrics and Business Statistics, 2018, 30 pages.

(56) References Cited

OTHER PUBLICATIONS

Feuz et al., "Ranking and Automatic Selection of Machine Learning Models Abstract", Technical Disclosure Commons, Dec. 13, 2017, 34 pages.
Eskridge et al., "Separating Different Scales of Motion in Time Series of Meteorological Variables", Bulletin of the American Meteorological Society, 78(7), 1997, pp. 1473-1484.
Chujai et al., "Time Series Analysis of Household Electric Consumption With ARIMA and ARIMA Models", Lecture Notes in Engineering and Computer Science, 2013, pp. 295-300.
Wolfram MathWorld, "Inner Product", https://mathworld.wolfram.com/InnerProduct.html, dated 2004, 2 pages.
H. S. Hota et al., "Time Series Data Prediction Using Sliding Window Based RBF Neural Network", International Journal of Computational Intelligence Research, vol. 13, No. 5, 2017, pp. 1145-1156.
Andrey Ignatov, "Real-time human activity recognition from accelerometer data using Convolutional Neural Networks", Applied Soft Computing, 62, 2018, pp. 915-922.
Wikipedia, "OpenFlow", http://en.wikipedia.org/wiki/OpenFlow, last viewed on Oct. 24, 2018, 4 pages.
Vmware, "How a Hypervisor-Converged Doftware-Defined Data Center Enables a Better Private Cloud", White Paper, dated 2014, 17 pages.
Software-Defined Networking (SDN) Definition, "Open Networking Foundation", https://www.opennetworking.org/sdn-definition/ last viewed on Oct. 24, 2018, 11 pages.
SearchServerVirtualization, "Why You Need VM Monitoring", https://searchservervirtualization.techtarget.com/tip/Why-you-need-VM-monitoring-tools, last viewed on Oct. 30, 2018, 4 pages.
Oracle Technology Network, "Oracle Integrated Lights Out Manager", https://www.oracle.com/technetwork/server-storage/servermgmt/tech/integrated-lights-out-manager/index last viewed on Oct. 30, 2018, 1pg.
OpenConfig, "Vendor-neutral, Model-Driven Network Management Designed By Users", dated 2016, 1 page.
Kanev et al., "Profiling a warehouse-scale computer", ISCA'15, Jun. 13-17, 2015, Portland, OR USA, 12 pages.
Iqbal et al., "Using SNMPV3 for Resources Monitoring of Hosted and Bare-Metal Hypervisors", dated May 2016, 9 pages.
Harrington et al., "An Architecture for Describing Simple Network Management Protocol (SNMP) Management Frameworks", dated Dec. 2002, 64 pages.
Dstat, "Linux Man Page", https://linux.die.net/man/1/dstat, last viewed on Oct. 30, 2018, 7 pages.
Claise et al., "Specification of the IP Flow Information Export (IPFIX) Protocol for the Exchange of Flow Information", dated Sep. 2013, 76 pages.
Bishop, Christopher, "Exact Calculation of the Hessian Matrix for the Multi-layer Perceptron", Published in Neural Computation 4 No. 4 (1992), 8 pages.
Barroso et al., "The Datacenter as a Computer", An Introduction to the Design of Warehouse—Scale Machines, Morgan And Claypool Publishers, dated May 2009, vol. 24, 156 pages.
Kocberber, U.S. Appl. No. 16/156,925, filed Oct. 10, 2018, Notice of Allowance and Fees Due, dated Nov. 29, 2021.
Hetherington, U.S. Appl. No. 16/140,841, filed Sep. 25, 2018, Final Rejection, dated Nov. 2, 2021.
Peinador, U.S. Appl. No. 16/122,398, filed Sep. 5, 2018, Notice of Allowance, dated Apr. 29, 2021.
Peinador, U.S. Appl. No. 16/122,398, filed Sep. 5, 2018, Corrected Notice of Allowability, dated Jun. 28, 2021.
Hetherington et al., U.S. Appl. No. 16/140,841, filed Sep. 25, 2018, Non-Final Office Action dated May 21, 2021.
Zhang et al., "Deep Symbolic Representation Learning for Heterogeneous Time-Series Classification", https://doi.org/10.48550/arXiv.1612.01254, dated Dec. 2016, 10 pages.
Shipmon et al., "Time Series Anomaly Detection: Detection of Anomalous Drops with Limited Features and Sparse Examples in Noisy Highly Periodic Data", https://doi.org/10.48550/arXiv.1708.03665, dated Aug. 2017, 9 pages.
Schroeder et al., "Understanding Disk Failure Rates: What does an MTTF of 1,000,000 Hours Mean to You?", ACM Transaction on Storage, vol. 3, Iss. 3, dated Oct. 2007, 16 pages.
Schmidt, Michael "Automated Feature Engineering for Time Series Data", Kdnuggets, https://www.kdnuggets.com/2017/11/automated-feature-engineering-time-series-data.html, dated 2017, 5 pages.
Sak et al., "Long Short-Term Memory Recurrent Neural Network Architectures for Large Scale Acoustic Modeling", Interspeech, https://research.google/pubs/pub43905/, dated 2014, 5 pages.
Pinheiro et al., "Failure Trends in a Large Disk Drive Population", 5th USENIX Conference on File and Storage Technologies, dated 2007, 13 pages.
Murray et al., "Machine Learning Methods for Predicting Failures in Hard Drives: A Multiple-Instance Application", Journal of Machine Learning Research 6, dated 2005, 34 pages.
Montrenko et al., "Feature Generation for Multiscale Time Series Forecasting", http://www.machinelearning.ru/wiki/images/b/b8/Multiscale2016ICDM.pdf, dated 2016, 8 pages.
Malhotra et al., "Long Short Term Memory Networks for Anomaly Detection in Time Series", in Proceedings of the 23rd European Symposium on Artificial Neural Networks, Computational Intelligence and Machine Learning, dated Apr. 2015, 6 pages.
Liao et al., "Combining Deep Learning and Survival Analysis for Asset Health Management", International Journal of Prognostics and Health Management, vol. 7, No. 4, dated Dec. 2016, 7 pages.
Klein, Andrew "Behind the Curtain of Backblaze Hard Drive Stats", http://storageconference.us/2017/Presentations/Klein.pdf, dated May 2017, 36 pages.
Botezatu et al., "Predicting Disk Replacement towards Reliable Data Centers", in Proceedings of the 22nd ACM SIGKDD International Conference on Knowledge Discovery and Data Mining, dated Aug. 2016, 10 pages.
Afolabi et al., "Hierarchical Meta-Learning in Time Series Forecasting for Improved Interference-Less Machine Learning", Symmetry, vol. 9, Iss. 11, dated Nov. 2017, 20 pages.
Yu et al., "Efficient Feature Selection via Analysis of Relevance and Redundancy", Journal of Machine Learning Research 5, pp. 1205-1224, 2004, 20 pages.
Hetherington, U.S. Appl. No. 16/140,841, filed Sep. 25, 2018, Advisory Action, dated Sep. 1, 2022.
Bergstra et al., "Hyperopt: A Python library for model selection and hyperparameter optimization", Computational Science & Discovery 8, 2015, 25 pages.
Zhu et al., "Proactive Drive Failure Prediction for Large Scale Storage Systems", In 2013 IEEE 29th Symposium on Mass Storage Systems and Technologies, DOI: 10.1109/MSST.2013.6558427, dated May 2013, 5 pages.
Xu et al., "Improving Service Availability of Cloud Systems by Predicting Disk Error", in Proceedings of the 2018 USENIX Annual Technical Conference, https://www.usenix.org/conference/atc18/presentation/xu-yong, dated Jul. 2018, 14 pages.
Xiao et al., "Disk Failure Prediction in Data Centers Via Online Learning", In Proceedings of the 47th International Conference on Parallel Processing, DOI: https://doi.org/10.1145/3225058.3225106, dated Aug. 2018, 10 pages.
Mahdisoltani et al., "Proactive Error Prediction to Improve Storage System Reliability", in Proceedings of the 2017 USENIX Annual Technical Conference, ISBN 978-1-931971-38-6, dated Jul. 2017, 13 pages.
Lu et al., "Making Disk Failure Predictions SMARTer?", in Proceedings of the 18th USENIX Conference on File and Storage Technologies, https://www.usenix.org/conference/fast20/presentation/lu, dated Feb. 2020, 19 pages.
Han et al., "Robust Data Proprocessing for Machine-Learning-Based Disk Failure Prediction in Cloud Production Environments", https://arxiv.org/abs/1912.09722, dated Dec. 2019, 12 pages.
Domingos, Pedro, "MetaCost: A General Method for Making Classifiers Cost-Sensitive", In Proceedings of the 5th ACM International Conference on Knowledge Discovery and Data Mining, dated Aug. 1999, 10 pages.

(56) References Cited

OTHER PUBLICATIONS

Chawla et al., "SMOTE: Synthetic Minority Over-sampling Technique", Journal of Artifical Intelligence Research, vol. 16, DOI: https://doi.org/10.1613/jair.953, dated Jun. 2002, 37 pages.

* cited by examiner

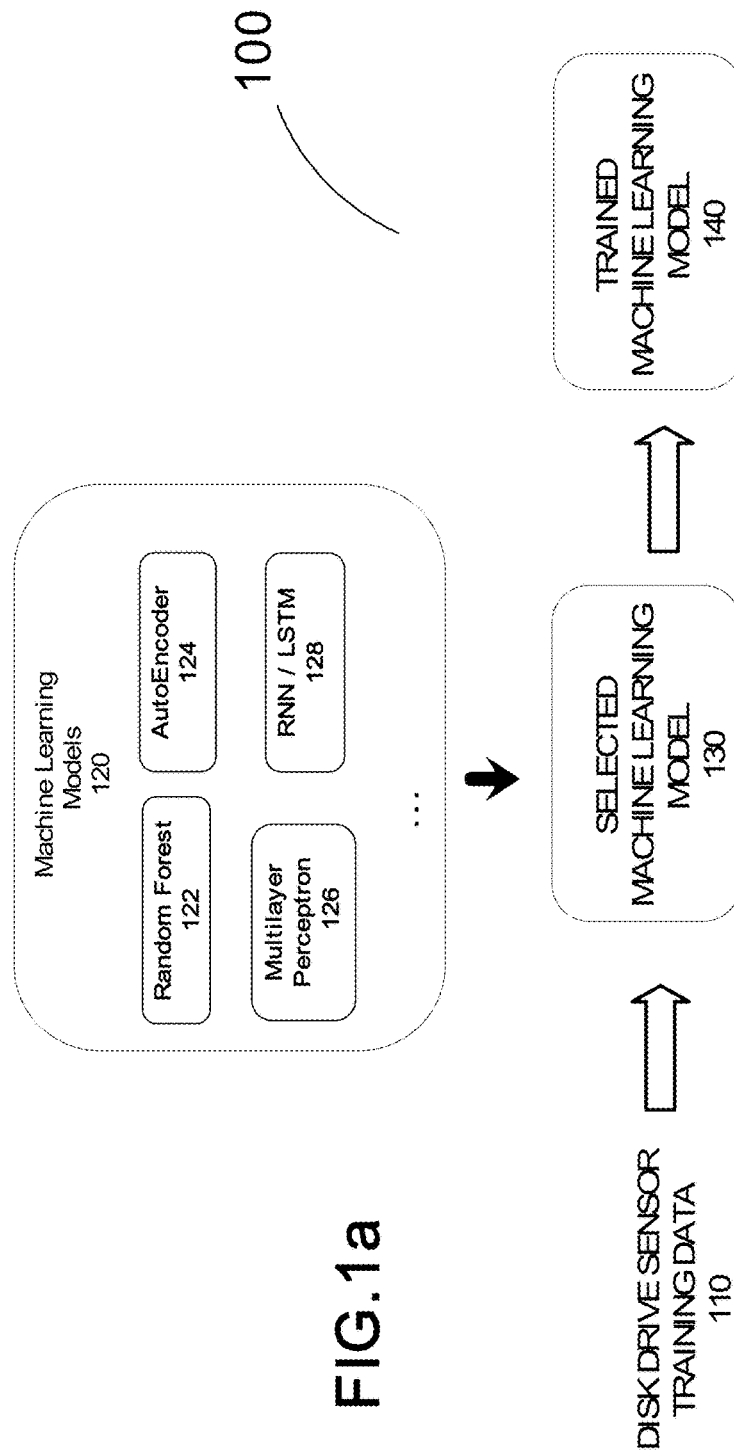
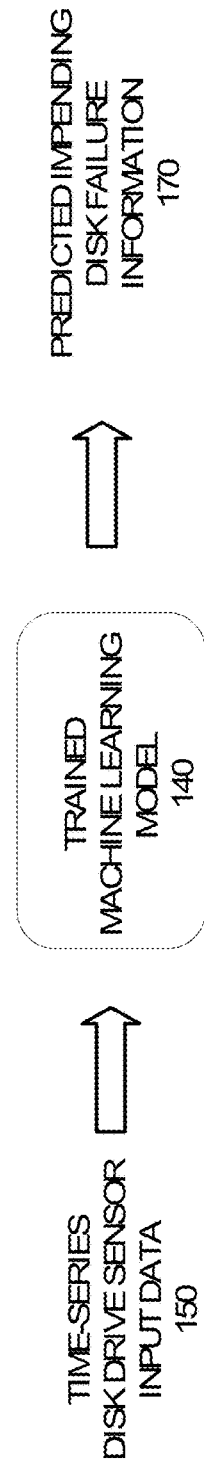

700  DISK FAILURE PREDICTION

DATE 701: 29 May 2018

PREDICTION DATE 702: 6 June 2018

LEGEND 703

| DISK HEALTH 704 | CLASSIFIER O/P 705 |
|---|---|
| HEALTHY 706 | 0.0 |
| FAILED 707 | 1.0 |

| DISK SN 710 | ATTRIBUTE A 720-1 | ATTRIBUTE B 720-2 | ... | ATTRIBUTE M 720-M | FAILURE ALERT? 730 | DISK HEALTH 740 | PREDICTION CONFIDENCE 750 |
|---|---|---|---|---|---|---|---|
| DISK 1 710-1 | | | | | NO 730-1 | 0.21 | 94% 750-1 |
| DISK 2 710-2 | | | | | YES 730-2 | 0.93 | 98% 750-2 |
| ... | | | | | ... | | ... |
| DISK N 710-N | | | | | NO 730-N | 0.32 | 87% 750-N |

FIG. 7

DISK DRIVE FAILURE PREDICTION WITH NEURAL NETWORKS

FIELD OF THE INVENTION

The present invention relates to a framework for training a specific machine learning system trained with disk drive sensor data to learn important attributes and identify disk drive failures ahead of time.

BACKGROUND

Disk drives are among the most failed components in a datacenter. Each failure could result in severe damages to businesses, ranging from short downtimes to severe data losses. While some disk drives failures are not foreseeable because they happen due to environmental or human factors, most of the failures are due to wear-and-tear and could be predicted by analyzing the data collected from disk drive sensors.

The disk drive sensors quantify operational conditions of a disk drive and log events that could indicate of failures. Similarly, some vendors even embed simple predictive threshold-based sensor reading analysis into the disk drives for signaling failures. These approaches are limited in their effectiveness as manufacturers conservatively tune error thresholds due to warranty conditions Disk drive sensor datasets were very small in comparison to the scale of disk drive deployment in a datacenter, which may number in the several thousands and more. Some recent disk drive sensor data findings have indicated that a small set of disk drive attributes as playing a significant role in disk drive failures. These findings tend to be specific to certain disk drive brands and models. Furthermore, some of the findings regarding attributes indicative of disk drive failure tend to exhibit high false positive rates.

Furthermore, disk drive sensor datasets indicate that disk drive failure behavior is complex. Approaches that attempt to capture this behavior using simple thresholding techniques or with straightforward statistical modeling approaches find themselves limited in predicting failures in a datacenter scale deployment using multiple disk drive vendors and models that are employed within large-scale application scenarios.

Approaches described herein involve a framework for applying machine learning on time-series disk drive sensor data in order to automatically identify disk drive attributes that are indicative of disk drive failure without being limited by disk drive vendor, disk drive model, or disk drive attribute sensor monitoring.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 1a depicts a machine learning system for disk drive failure prediction during training of a machine learning model according to an embodiment.

FIG. 1b depicts a machine learning system for disk drive failure prediction after training the machine learning model according to an embodiment.

FIG. 7 is an example of a tabular output generated by the system flowchart according to an embodiment.

DETAILED DESCRIPTION

Figure 2:
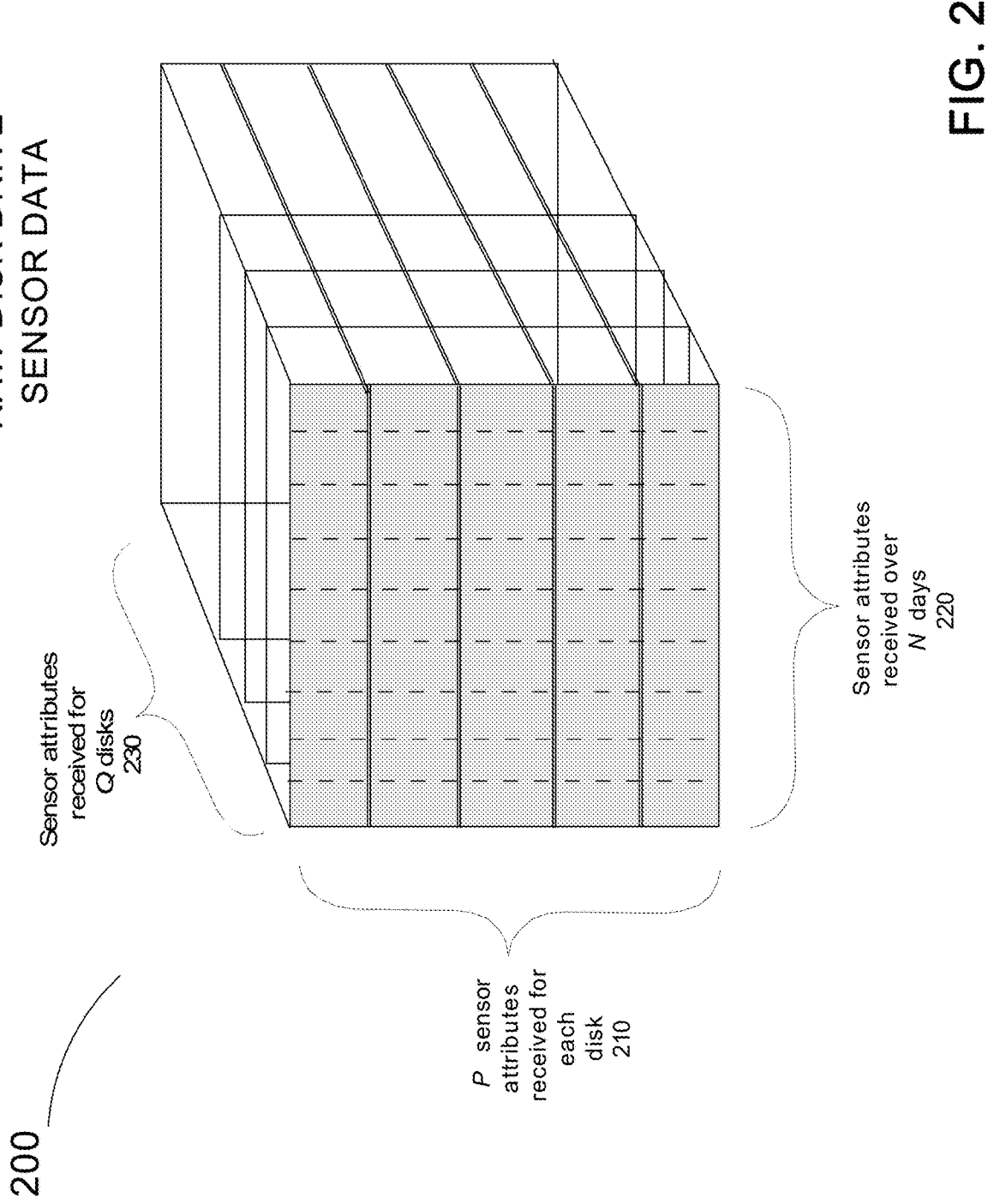
FIG. 2 depicts three-dimensional data received from the sensors according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Described herein is a framework for training a specific neural network topology with large population of disk drive sensor data. While disk drives contain sensor data that is collected over long periods of time, attributes from some disk drive sensor data is more indicative of impending disk drive failure than others. It is demonstrated here that, by employing specific data preprocessing and feature enhancement techniques, a specific neural network topology may be trained with a large population of disk drive sensor data to learn the important attributes and achieve high accuracy in identifying failures ahead of time for a wide variety of disk drive brands and models.

Disk Drive Attributes and Disk Failure Studies

A disk drive is considered to have failed when the disk drive is replaced because it has either stopped working or is showing signs of impending failure. A disk drive is said to have stopped working when the disk appears physically dead—i.e., does not respond to commands from the operating systems (e.g., generated via console commands), or the RAID system instructs that the drive cannot be read or written.

Disk drive sensor data sets collect sensor reading for disk drives. Certain disk sensor attributes of disk sensor data sets that may be indicative of impending failure include: relocated sectors count, reported uncorrectable errors, command timeout, current pending sector count, uncorrectable sector count. The certain disk drive sensor attributes are obtainable for disk drives from various manufacturers.

Under simple thresholding approaches, when certain disk drive sensor data attribute values reach a threshold, disk drive failure is predicted. It has been found that when these attributes reach a certain threshold, a disk drive may fail with approximately 70% probability.

However, significant false positives are encountered under simple thresholding. About 9% of all the healthy disk drives in a datacenter that are identified as failing may not fail.

Another approach for predicating disk drive failures uses statistical modeling techniques that are based changes to disk drive sensor attributes. Disk drive sensor attributes change behavior before the failure, and the change point is different for each disk drive sensor attribute. Moreover, the change points vary not only among disk drive vendors (e.g., Seagate vs Hitachi), but also vary among different models of the same brand (e.g., Seagate 1.5TB vs. Seagate 4TB).

Once pertinent disk drive sensor attributes and respective change points are identified, a compact vector may be created to represent the attributes. The compact vector of failed disk drive data, along with healthy disk drive data in the same format, is fed into a statistical classifier for accurate predictions. The healthy disk drive data is also downsampled (i.e., selecting some representative disks among the healthy disk pool) so that the classifier may learn failed behavior.

The classifier works well for some brands and models of disk drives. However, the results for other disk drive brands and models are not as good. Similarly, the classifier could learn the healthy behavior presented to the model but does not generalize well (e.g., only classify a limited subset of healthy disks but not all the healthy disks).

The embodiments described herein show that even with a limited dataset of disk drive sensor information, the state of the art in disk drive failure prediction may be improved over the approaches described above.

Machine Learning/Deep Learning Models

The terms machine learning and deep learning are both used interchangeably in this description. The objective of machine learning is to build a model of behavior from experience and use this constructed model to predict future behavior. Machine learning may be used to build complex models to describe data sets that do not lend themselves to statistical modeling. The phase of building a model of behavior from experience using known data sets is the training phase of machine learning. The trained model may then be used in a prediction phase to predict future data values.

Using machine leaning for impending disk drive failure involves a training phase of fitting a complex mathematical model to learn the behavior of the time-series disk drive sensor data. The fitting is initially performed on a training set of the time-series data. The trained machine learning model may then be used to predict disk drive failures.

Unlike statistical models, machine learning models may learn more complex patterns and properties from the time-series data, potentially making the models a more powerful and general approach for predicting disk drive failures. Some examples of machine learning and deep learning models that are used for time-series prediction are:

Random Forest: Random forests or random decision forests are an ensemble learning approach that construct a collection of randomly generated nodes and decision trees during the training phase. The different decision trees are constructed to be each randomly restricted to only particular subsets of feature dimensions of the data set. Therefore, the decision trees gain accuracy as the decision trees grow without being forced to over fit the training data as would happen if the decision trees were forced to be restricted to all the feature dimensions of the data set. Predictions for the time-series are calculated based on the mean of the predictions from the different decision trees.

Multilayer Perceptron (MLP): A feedforward neural network with multiple fully connected layers used for supervised learning. The network is trained by back-propagating errors to update the weights (connections) between neurons based on the prediction of normal or anomalous behavior relative to the actual classification.

Autoencoder: Similar to MLP, autoencoders are feedforward neural networks consisting of multiple fully connected encoding and decoding layers. However, autoencoders are used for unsupervised learning by trying to reconstruct the input features in the output.

Recurrent Neural Networks (RNN)/Long Short-Term Memory (LSTM): RNNs and LSTMs are variants of neural networks, which contain cycles in the neuron connections, such that the network maintains memory based on previous data points that were passed to the network. These models explicitly operate on ordered sequences of data points, which makes them well suited for time-series analysis. RNNs and LSTMs are used for unsupervised training and are trained based on the error between the predicted value and the actual next value in the sequence. Simple RNNs suffer from the vanishing gradient problem—LSTMs resolve this problem by preserving the error that is back-propagated through time and through layers—i.e., they maintain a more or less constant error.

For practical purposes, an LSTM may be considered as a black box—one whose training will converge faster, is capable of memorizing significant correlations in the historical data and learning long-term dependencies in the time-series data. The two-common usage of LSTMs are anomaly prediction and classification. For the anomaly detection tasks, the LSTMs are trained for predicting the next sequences in time series data, and therefore identifying the anomalies in the new data based on deviations from the predicted data. For the classification tasks, LSTMs classify labeled (anomalous and normal) sequences.

FIG. 1a depicts a machine learning system 100. The system 100 may have stored within it, several machine learning models 120 that may be used for training. These machine learning models may include, without limitation, Random Forest 122, Autoencoder 124, Multilayer Perceptron 126, and Recurrent Neural Networks (RNN)/Long Short-Term Memory (LSTM) 128. In addition, a selected model 130 could be an ensemble (i.e., a combination) of machine learning models shown in 120, trained with different partitions of the training data. A selected machine learning model 130 is trained using Disk Drive Sensor Training Data 110, and evaluated using test and validation data until a satisfactory trained machine learning model 140 is obtained.

FIG. 1b depicts the trained machine learning model 160 that may be used subsequently with Disk Drive Sensor Input Data 150 in order to output Predicted Impending Disk Failure Information 170.

Using Moving Averages for Time Series Analysis

Simply applying one of the above machine learning models directly to a given time-series data set does not necessarily result in high prediction accuracy for anomalies. In addition to selecting the correct model and correct set of hyper-parameters for that model, the selection or generation of input features, and preprocessing techniques applied to these input features, may have a significant impact on the anomaly detection performance.

Multiple existing time-series analysis techniques, both statistical and machine learning based, have identified the benefits of using averages, or similar operations, for time-series forecasting and anomaly detection. For example, moving averages, weighted moving averages, exponential smoothing, or other filter-based techniques may be used to smooth time-series to evaluate statistical deviations of data points from the smoothed time-series or as filtered inputs to other models. Sequential probability ratio testing (SPRT) evaluates level shifts (changes in the average) of the residuals generated based on the time-series predictions. Seasonal trend decomposition techniques, such as Sequential Trend Decomposition using Loess (STL), use a form of moving averages to separate out the long-term trend in the time-series from the seasonal and residual components in the time-series. The trend information can then be used to determine if the time-series is stationary or generally increasing/decreasing.

It is known that time-series forecasting using machine learning models is improved with the use of additional statistical features. Furthermore, generating multiple moving average features with different window sizes preserves different levels of detail from the original time-series. In embodiments described herein, moving average information is presented as additional features to machine learning models, and is shown to be very useful in forecasting with time-series data.

Embodiments described herein improves the accuracy of time-series forecasting using an automated framework for generating statistical features, which describe trends in the original time-series. Co-pending U.S. patent application titled "AUTOMATED MOVING AVERAGE FEATURE GENERATION FOR TIME-SERIES FORECASTING AND ANOMALY DETECTION" is hereby incorporated by reference. In some embodiments, the original time-series data is augmented with automatically generated statistical features, and the augmented time-series data is provided as inputs to machine learning or deep learning models. As depicted in the co-pending patent application titled "AUTOMATED MOVING AVERAGE FEATURE GENERATION FOR TIME-SERIES FORECASTING AND ANOMALY DETECTION," the size and number of generated moving average features may greatly affect the time-series anomaly detection accuracy. As such, the structure of the generated features must take into account the properties or patterns in the original time-series. However, manually evaluating multiple different numbers and sizes of moving averages is a time-consuming and challenging task. Embodiments presented herein may employ the techniques described in "AUTOMATED MOVING AVERAGE FEATURE GENERATION FOR TIME-SERIES FORECASTING AND ANOMALY DETECTION" to automate the processing of generating, evaluating, and selecting the best set of moving average features to maximize the accuracy of time-series data forecasting.

Computational Framework

Embodiments described herein operate with sequences of disk sensor data. The disk sensor data contain sensor readings that are collected from a disk for a certain period of time. A sample contains disk sensor attributes, i.e., readings of different sensors, on a given day. In order to characterize the training process, consider that P attributes are obtained from sensor data for a single disk. Additionally, samples collected on N consecutive days is termed a sequence of size N. Then, the sensor data from a disk corresponds to a <N×P> matrix. The machine learning model may be trained with data from Q disks. The sensor data may then be represented by a three-dimensional matrix, <Q×N×P>.

FIG. 2 depicts the three dimensional input data that defines the raw data 200 received from the disk drive sensors. It shows that P sensor attributes 210 are received for each disk, the sensor attributes are received over N days 220, and the sensor attributes are received for Q disks in total 230. In some embodiments described herein, the raw data represented in the <Q×N×P> matrix is preprocessed before being used to train the machine learning model. The deep learning model used in embodiments described herein is an RNN LSTM machine learning model.

Some embodiments described herein includes a computational framework involving the following three phases: (i) a preprocessing sensor disk data phase, (ii) a building and training the LSTM RNN machine learning model phase, and (iii) a prediction and evaluation phase. These phases are described in detail below:

Pre-Processing Sensor Disk Data

Embodiments described herein establish that the preprocessing stage is crucial for the precision and recall of the machine learning model. The pseudo-code describing the Preprocessing with Sequence Creation Algorithm presented in the following section details the steps of the preprocessing stage. In some embodiments, the preprocessing phase goes through the disk drive sensor readings corresponding to failed disks, creates enhanced sequences of data, and outputs the enhanced sequences. The output enhanced sequences, in turn, are the input sequences received by the machine learning model. Additionally, for each failed disk, some embodiments add, to the output (i.e., input sequences received by the machine learning model), a fraction of disk drive sensor readings that correspond to disk drive sensor readings from healthy disks—this enables the model to learn the normal behavior. The preprocessing phase is described in detail below. The main components and parameters of the preprocessing stage are the following:

Heads-Up Period

The parameter "Heads-Up Period" describes an advance period, and may be defined as a period of time in advance for predicting disk failure. This time may be defined in terms of number of days before which disk failure must be predicted. This parameter defines the samples in terms of day that should be hidden from the machine learning model so that it can learn to make predictions ahead of time. For example, if the "Heads-Up Period" parameter has a value of 6 days, then the training data should not provide any disk drive samples for the last six days while training the machine learning model.

Sequence Length

Starting from the last valid sample, the number of days (samples) that will be input to machine learning model. For failed samples, the time stamp associated with the last valid sample is the calculated as:

$$\text{Last\_valid\_sample\_time} = \text{failure time} - \text{heads\_up\_period}.$$

For example, if the heads_up_period unit of time is "days", then if the heads_up_period has a value of '1', then all the samples may be used until the day before the failure time. If the value for the heads up period is '7', then samples within a week of the failure may not be used.

Figure 3:
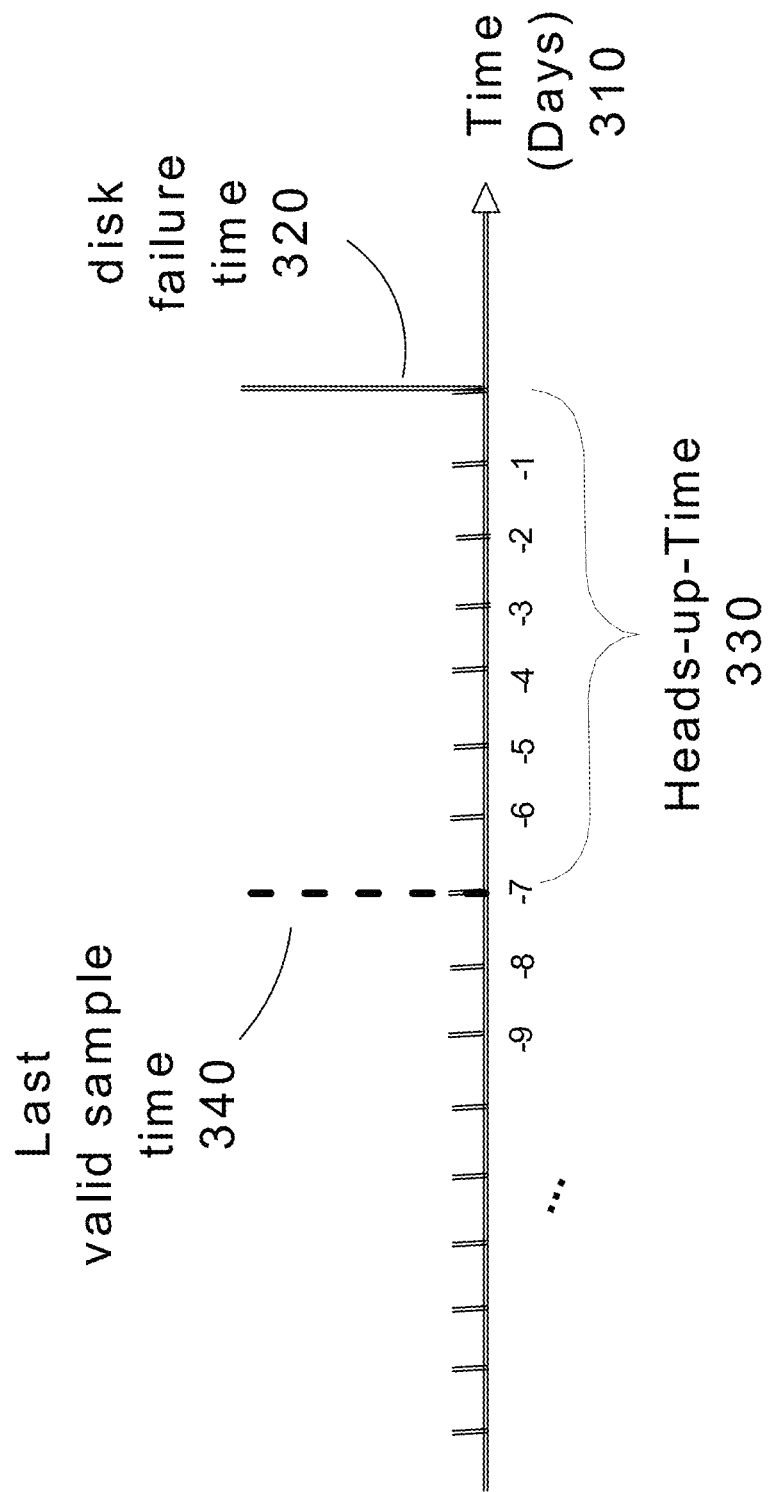
FIG. 3 depicts the relationship between some parameters according to an embodiment.

FIG. 3 depicts the relationship between the failure_time parameter, the heads_up_time parameter, and the last_valid_sample time parameter defining the preprocessing that establishes the training sequence of data. Thus, for a timeline of days 310, when the heads_up_time parameter 330 is specified, then, for successfully predicting an impending failure on disk failure time 320, the last valid sample to be used for training must be last_valid_sample_time 330. Any of (including all) the disk drive sensor readings obtained on or before the last_valid_sample_time may be provided in the training phase to the machine learning model. None of the disk drive sensor readings obtained after the last_valid_sample_time may be provided in the training phase.

Healthy/Failed Disk Ratio

Healthy/failed disk ratio defines the number of healthy disks added to the output matrix for every failed disk. Given that the number of healthy disks are significantly larger than the failed disks, there is a class imbalance in any dataset. In some embodiments, by adjusting the ratio, the class imbalance may be broken or reduced. The pseudo-code describing the Preprocessing with Sequence Creation Algorithm presented in the following section implements the desired functionality in the routine termed: get_random_healthy_samples. There are multiple ways of selecting the healthy disks. The healthy disk choices include but are not limited to (i) selecting random from the entire healthy disk pool, (ii) selecting random disks from the last_valid_sample days of failed disks, (iii) applying certain classification functions (e.g., k-means), and subsequently applying (i) or (ii). The primary insight behind these techniques is that the healthy (normal) disk behavior is relatively easier to learn given the abundance of healthy samples.

Enhanced Feature Addition

Simply applying a machine learning model directly to a given sequence of time series data does not necessarily result in high prediction accuracy. Machine learning based approaches benefit greatly from enhancing the feature set that is provided to the model. Enhanced features are values generated by applying a statistical function to the disk sensor readings. For example, enhanced features may be computed, using the time series disk drive sensor data, as moving averages, weighted moving averages, smoothed time series data using exponential smoothing, filter-based smoothed data, etc., among others. These enhanced features are added to the disk drive sensor data to generate enhanced feature sequences.

Some embodiments described herein include generating the enhanced sequence by performing the enhanced feature addition to the time series sensor data. In the pseudo-code depicting the Preprocessing with Enhanced Feature Sequence Creation Algorithm, the add_enhanced_features routine implements this functionality. The input to this routine is a sample, which consists of a sequence that belongs to single disk. On a given sample, the enhance function, which is a window function, is applied. A window function involves a function that is zero-valued outside of an interval. As just noted, the applied enhancements may be any of (i) simple moving averages, (ii) exponential moving averages, (iii) statistical variance, maximum, minimum, standard deviation, etc. Applying a window function to an enhancement may be, for example, deriving simple moving average values for just a specified time-interval of the sensor data. Furthermore, the enhance function is applied multiple times with different window sizes, i.e., different time-intervals, defined by a specified parameter that is labeled: enhancement factor (efactor).

For example, for a sequence length of N=20 and a specified efactor=4, the enhancement functions are applied to the sequence with window sizes of 5, 10, 15, 20. In doing so, four times more features get added to the sequence after the feature enhancement is completed during the preprocessing phase. In some embodiments, given that enhancements apply to a window of data, before creating the input sample for this routine, the sequence length is doubled so that the therefore the output of the enhance function still contains a sequence length of N. This sequence increase is defined by the parameter: largewindow in the pseudo-code.

The pseudo-code below depicts the Preprocessing with Enhanced Feature Sequence Creation Algorithm:

---

Preprocessing with Enhanced Feature Sequence
Creation Algorithm: Pseudo-Code

```
N = get_sequence_length( )
headsupdays = get_headsup_days( )
hratio = get_healthy_ratio( )
efactor = get_enhancement_factor( )
def add_enhanced_features(sample):
        s_stacked = sample
        for step in linspace(0, N, num=N/efactor, firststep=False):
                s_stacked = vertical_stack(s_stacked,
                        enhance(sample, step)))
        return stacked_s
def create_enhanced_sequence(sample):
        largewindow = get_window(N*2, sample, headsup_days)
        enhanced_largewindow = add_enhanced_features(largewindow, N)
        return get_window(N, enhanced_largewindow, headup_days)
for fsample in failed_samples:
        failed_sequence = create_enhanced_sequence(fsample)
        output(failed_sequence)
        healthy_samples =
        get_random_healthy_samples(fsample.failday,hratio)
```

---

Performing the feature enhancement as described has two benefits:

Easier change-point detection by smoothened attributes: Applying an enhancement function such as a simple moving average has a significant impact on the accuracy of the LSTM RNN. This is because the functions reduce the effects of minor fluctuations on the sequence, smoothen the attribute values, and hence, make the attribute change point detection easier. Given that the change point differs across attributes, applying the same enhancement function with various window sizes helps significantly in determining the accurate change point for the various attributes.

Easier sequence length selection: Applying the enhancement functions involves applying window functions. Thus, performing feature enhancements enable the generated sequence to carry additional information, which is normally outside of the input time series sensor sequence. As a result, creating a representative sequence is less sensitive to the sequence length because it is less likely to miss out an important but-not-recent change in an attribute.

RNN LSTM Model

Embodiments described herein present approaches using the LSTM RNN model for predicting disk failures. Table 1 shows a three-layer bi-directional LSTM design followed with an additional activation layer. When created sequences are input to the LSTM RNN, the input layer first applies masks sequences of un-aligned sizes, then applies activation operations. The bidirectional LSTM layers, train incoming sequences first in the input order, then also in reverse order to fully understand the context within the sequence. At each layer, there are a predefined number of neurons, which is a hyper-parameter that is presently tuned in embodiments described herein. Similarly, the number of layers are subject to hyper-parameter tuning.

TABLE 1

| LSTM topology | | |
| --- | --- | --- |
| Layer | Function | Details |
| Output | Activation | Sigmoid |
| 4 | Activation | Rectified |
| 3 | LSTM_3 | Bidirectional |
| 2 | LSTM_2 | Bidirectional |
| 1 | LSTM_1 | Bidirectional |

TABLE 1-continued

LSTM topology

| Layer | Function | Details |
| --- | --- | --- |
| Input | Activation | Sequence input with masking |

In each created sequence (by the preprocessing stage), there is an additional field that indicates whether the sequence belongs to a healthy or failed sample. Therefore, our LSTM topology is designed in a way that the output layer outputs a classification prediction between zero (healthy) and one (failed).

Predicting Disk Drive Failure Using a Neural Network

Figure 4:
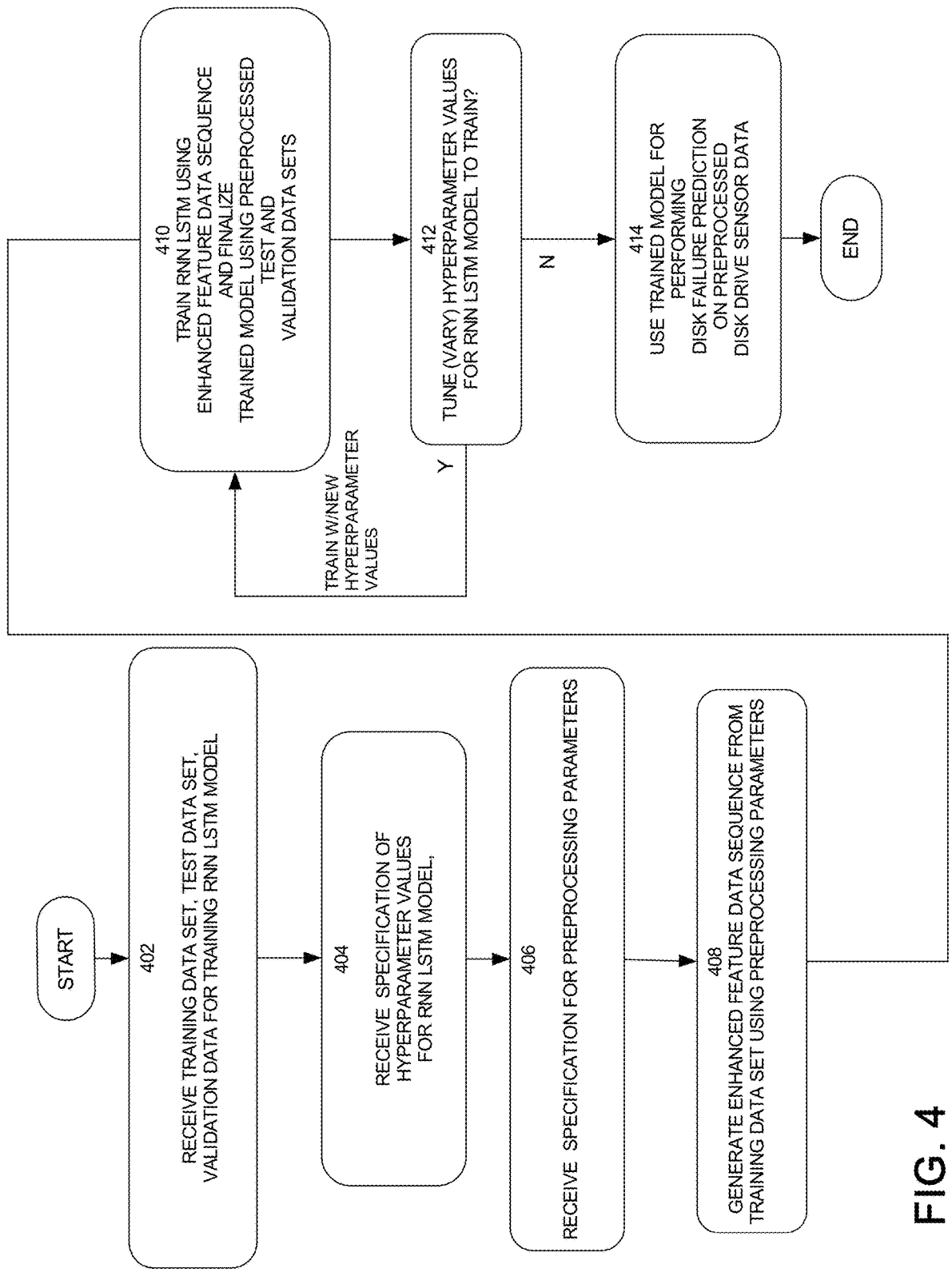
FIG. 4 is a flowchart depicting a method for training and using a machine learning model according to an embodiment.

FIG. 4 is flowchart 400 illustrating a method for training a RNN LSTM deep learning model to make predictions of disk drive failure, according to an embodiment of the invention. The steps of FIG. 4 constitute merely one of many procedures that may be performed to make predictions of disk failure. Other procedures may include more or fewer steps in other orders than depicted in FIG. 4.

At step 402, raw sensor readings are received from disk drive sensors. These readings may represent disk drive attribute values generated by disk drive sensors that are monitoring the disk drives. Sets raw data readings are used to form one or more training data set, test sets as well as validation sets for training a RNN LSTM deep learning model.

In an embodiment, at step 404, hyper-parameter specifications are received for tuning the RNN LSTM deep learning model to be trained. Without limitation, these hyper-parameters may include number of layers in the deep learning model, number of neurons at each layer, etc.

In some embodiments, at step 406, specifications may be received for parameters involved with preprocessing the raw disk drive sensor data. The parameters may include a specification of heads-up-days, data sequence length, a specification of healthy-to-failed disk ratio, and enhancement factors, also termed e-factor values, defining window sizes for generating moving window averages as additional features for input to the machine learning model.

In step 408, the raw sensor readings received in step 402 are preprocessed based on the preprocessing specifications received in step 406 to generate the preprocessed sequence training data that will be used to train the deep learning model.

In step 410, the RNN LSTM deep learning model is trained. The model is first tuned for training using the specified hyper-parameters, and then trained using the preprocessed sequence training data. The trained model is evaluated using the preprocessed test and validation data sets.

In step 412, it is determined whether the hyperparameter value may be varied to, for example, train a RNN LSTM with greater predicative accuracy. If the hypermeters are varied, then execution returns to step 410.

Otherwise, at step 414, the established trained RNN LSTM may be used for performing disk failure predictions from disk drive sensor readings that are preprocessed and fed to the RNN LSTM deep learning model.

Functional Overview

In an embodiment, a computer-implemented process, computer system and computer program are provided for predicting disk drive failures using a recurrent neural network (RNN) long short-term memory (LSTM) model. How- ever, any kind of machine learning model may be used. The system described herein may be implemented in any type of a data center facility or a cloud service provider facility wherein data stored in disks need to be monitored for health.

Figure 5:
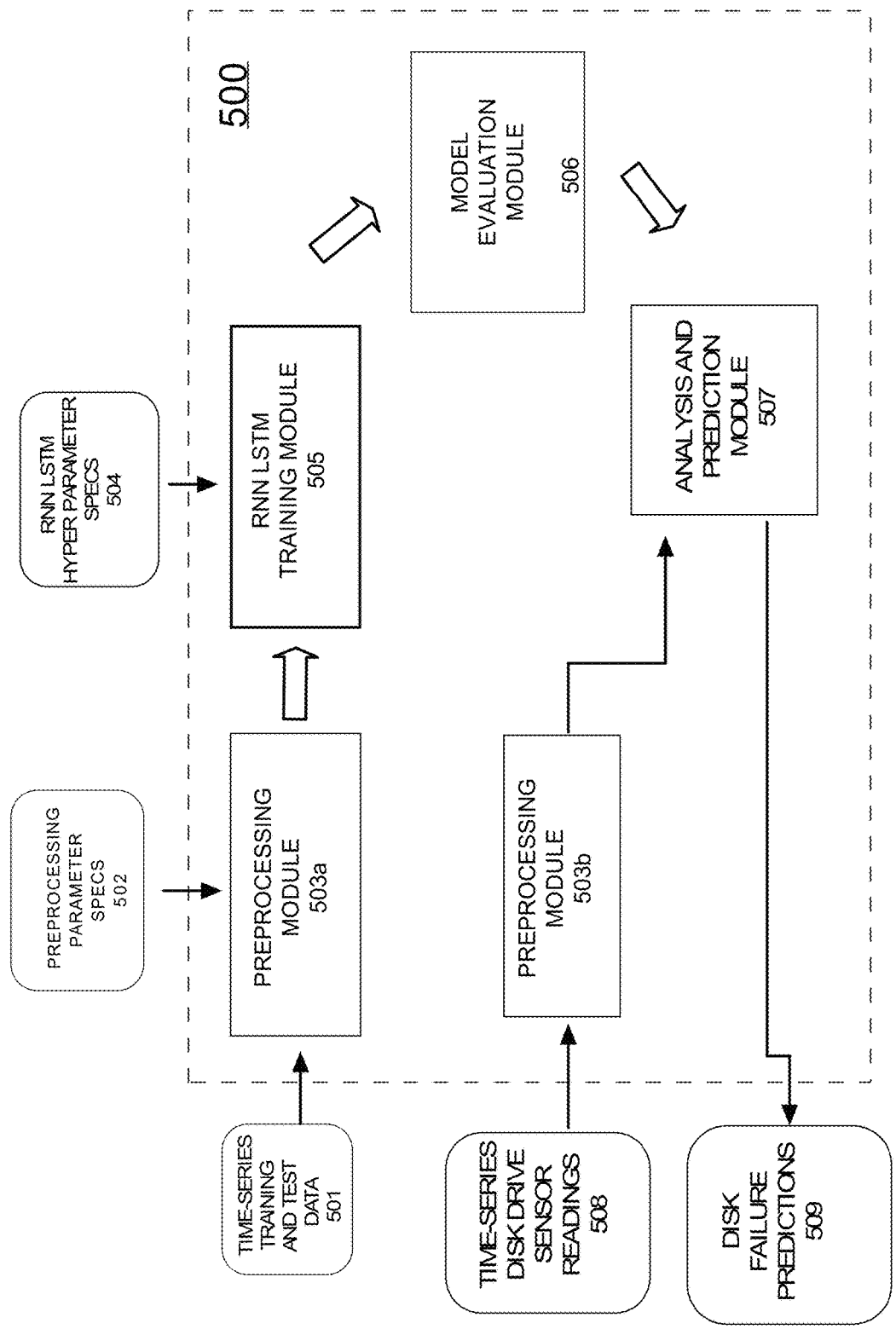
FIG. 5 is a functional overview of the system according to an embodiment.

FIG. 5 is a functional overview of the system in some embodiments of the invention. In an embodiment, Computer System 500 comprises a Preprocessing Module 503.

The Preprocessing Module 503 receives preprocessing specifications 502 for preprocessing the raw input data into sequences before sending the data as input to the RNN LSTM model. The preprocessing specifications include specifications for one or more of the following parameters: heads-up-days, data sequence length, a specification of healthy-to-failed disk ratio, and enhancement factors, also termed e-factor values, defining window sizes for generating moving window averages. During the RNN LSTM training phase, the Preprocessing Module 503 also receives raw disk drive sensor readings from sensors monitoring various attributes of disk drives in a facility as training data sets, as well as test data sets and validation data sets. After the training of the RNN LSTM is completed, the Preprocessing Module 503b will receive the raw disk drive sensor data 508 to be analyzed by the trained RNN LSTM model 507 for making predictions about disk failures.

During the training phase, the output of the Preprocessing Module 503 is fed to the RNN LSTM Training Module 505 for training the RNN LSTM deep learning model. Prior to training, the Training Module 505 tunes the RNN LSTM model using hyper-parameter specifications 504 that may be provided by a user to the System 500. The Model Evaluation Module 506 is responsible for testing and validating the RNN LSTM model and establishing the trained RNN LSTM model that will then be used for analyzing the disk drive sensor data. Once the RNN LSTM model has been trained, the Analysis and Prediction Module 507 will receive the preprocessed input data from disk drive sensor reading, and analyze the data using the trained RNN LSTM model and provide as output, predictions regarding impending disk failures.

Graphical User Interface and Tabular Display

Figure 6:
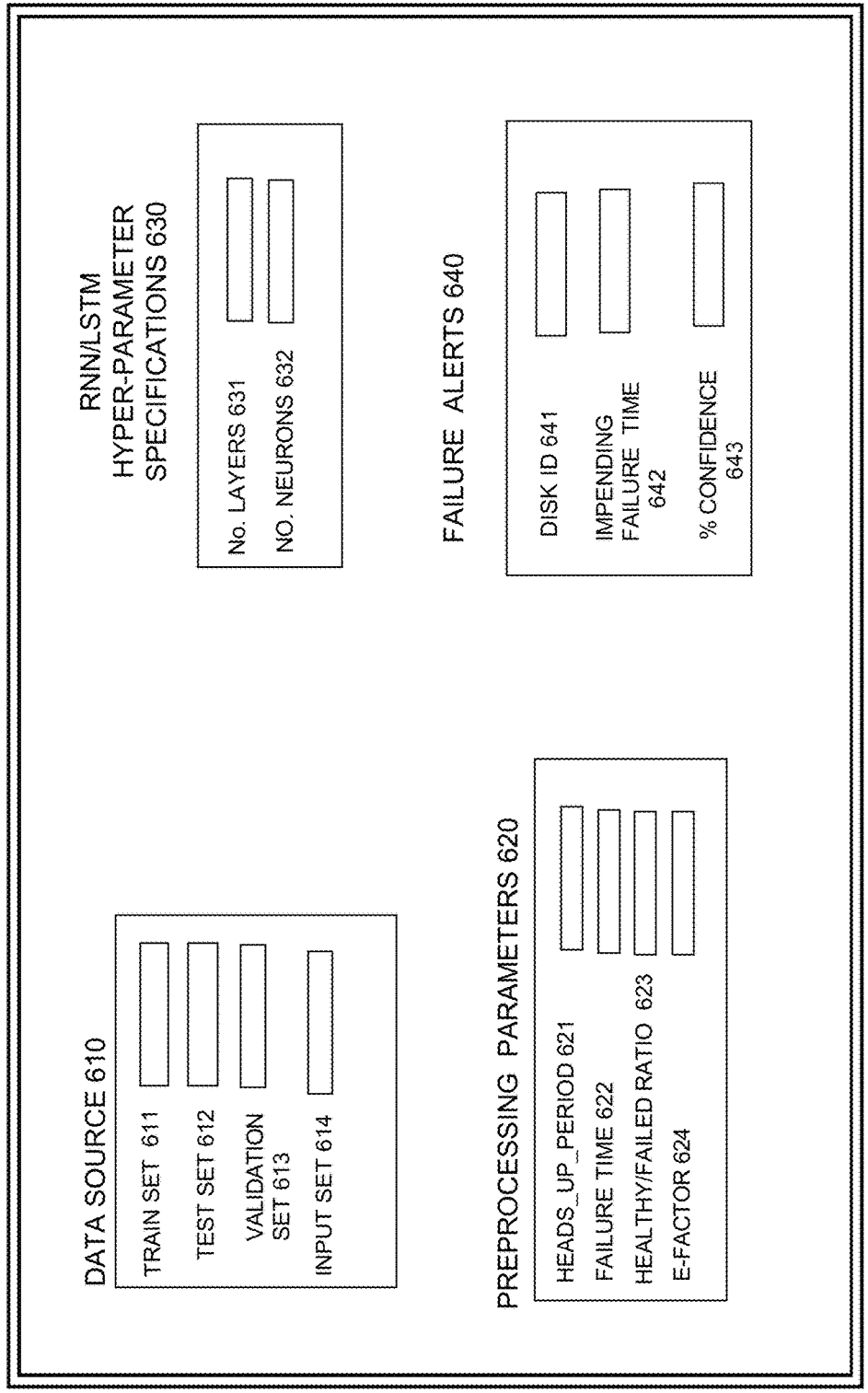
FIG. 6 depicts an example of a graphical user system in the system according to an embodiment.

FIG. 6 illustrates an example graphical user interface (GUI) in accordance with one or more embodiments. An input device connected to the system may cause a GUI 600 to be displayed on device. In some embodiments, the GUI 600 includes an interface that may be used for providing input data to the system 500. In some embodiments, different input devices may implement different combinations of these interfaces.

The GUI may include a data source component 610 for specifying one or more input data sources. The data source component may be used to select a Training data set 611, Test data set 612, validation data set 613, as well as input data set 614. In some embodiments, the data source component 610 includes components that allows a user to provide authentication information that allows the user to access the datasets. In some embodiments, the data source/s may be one or more containers of data stored in a database that may be additionally specified within the GUI.

The GUI 600 may include a Preprocessing Parameter Specification component 620 for specifying preprocessing parameter specifications 502 as input to the preprocessing module 503a. Some of the preprocessing parameters that may be specified include, without limitation, Heads_up_Period 621, Failure_Time 622, Healthy/Failed Disk ratio 623, and E-Factor 624.

The GUI 600 may include a RNN/LSTM Hyper-Parameter Specification component 630 for specifying hyperparameter specifications 504 as input to the RNN LTSM training module 505. Some of the hyper-parameters that may be specified include, without limitation, Number of Layers 631 and Number of Neurons per layer 632.

The GUI 600 also may include an output display component 640, that may display for a set of one or more Disk IDs 641, an Impending Failure Time 642, as well as a Confidence Measure 643 associated with the impending failure date prediction.

FIG. 7 depicts an example of a tabular output display of Disk Failure Prediction 700 generated by some embodiments described herein. The table display may be generated on a particular Date 701, showing the disk failure predictions for a Prediction Date 702. The tabular display may include attribute values, failure alerts, general disk health and prediction confidence values for a number of monitored disk drives with Disk SNs (Serial Numbers) 710 (710-1, 710-2, . . . , 710-N). The Attribute Values are obtained from corresponding sensor monitoring, for each of a number of different attributes—(720-1, 720-2, . . . , 720M). Based on the attribute values, the trained RNN LSTM model returns a Failure Alert 730 (730-1, 730-2, . . . , 730-N) for each of the disks with Disk ID (710-1, 710-2, . . . , 710-N) respectively. The Disk Health 740 for each disk may be classified by the RNN LSTM (Classifier Output 705) to be in a numerical range between 0.0 (Healthy 706) and 1.0 (Failed 707) as shown by each of the entries in column 740, and explained in legend 703. The Prediction of Failure Alert 730 and Disk health 740 may also have an associated historical confidence measure 750, displayed by the individual values 740-1, 740-2, . . . , 740N, respectively. 740 and 750 are based on historical values derived from previous observations and model behavior to demonstrate how accurate the model was performing since deployment.

Thus, for example, as shown in the example values in FIG. 7, on the date of '29 May 2018', a disk failure prediction has been generated and displayed for the date of '6 Jun. 2018'. According to the display, disk with disk ID 710-2 is shown to be in a disk health value of '0.93', with a prediction confidence of '98%' 740-2. Thus, Disk-2 is considered close to failure, and a Failure Alert of 'YES' has been issued for Disk-2 710-2. Note from the date values in 701 and 702 that the implicit Heads_Up_Time is eight days. The Failure Alert Values of YES/No is a binary decision that may be made in some embodiments of the invention using predefined thresholds (during model training) associated with determined disk health values. In other embodiments, the thresholds may be tunable by a system administrator using the GUI 600. In some embodiments, the output may be in the form of a constantly maintained chart that provides the disk health parameters for all the analyzed disks in the facility. In other embodiments, the output may provide an explicit alert in the form of blinking visual and aural indicators.

In some embodiments, the RNN LSTM design is simplified for the sake of reducing training or inference (prediction) latency. However, use of the deeper RNN LSTM achieves a greater generalization compared to the simplified shallow LSTM topology that only works on a subset of the disk vendor/model population.

Advantages Over Other Approaches

The disk drive failure prediction techniques described in various embodiments presented herein allows for improvements in overall storage reliability, quality of service, and cost reductions within any data storage facility due to following reasons:

Avoid permanent data loss: Each disk failure causes a window of vulnerability within the system, where multiple failures in the same volume may result in permanent data loss. Embodiments presented herein enable predictions of disk failures so that informed volume allocation decisions may be employed to spread the risk evenly on different volumes.

Improve quality of service: With every disk failure, the system will go through an expensive restore as the contents must be recovered from other replicas. By predicting the disk failures in advance, the disk recovery operation is optimized for minimal impact on the storage infrastructure. The embodiments presented herein provide significant improvements to the quality of service of a system.

Assessing the risks in datacenter infrastructure: Understanding the remaining useful life of a disk is a significant factor in helping businesses with capacity planning, allocation, and forecasting. Embodiments described herein provide for informed decision-making during capacity planning and allocation.

Machine Learning Model

A machine learning model is trained using a particular machine learning algorithm. Once trained, input is applied to the machine learning model to make a prediction, which may also be referred to herein as a predicated output or output.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, executed, and/or as generating an output or predication, a computer system process executing a machine learning algorithm applies the model artifact against the input to generate a predicted output. A computer system process executes a machine learning algorithm by executing software configured to cause execution of the algorithm.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C#, Ruby, Lua, Java, Matlab, R, and Python.

Artificial Neural Networks

An artificial neural network (ANN) is a machine learning model that at a high level models a system of neurons interconnected by directed edges. An overview of neural networks is described within the context of a layered feed-forward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input node, the activation value is simply an input value for the input. For an activation neuron, the activation value is the output of the respective activation function of the activation neuron.

Each edge from a particular node to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation node, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of nodes in layer L−1 and L is N[L−1] and N[L], respectively, the dimensions of matrix W of N[L−1] columns and N[L−1] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input node. The particular input may be stored as vector. Training data comprises multiple inputs, each being referred to as sample in a set of samples. Each sample includes a value for each input node. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every node in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of nodes and/or edges determines the size of matrices needed to implement a neural network. The smaller the number of nodes and edges in a neural network, the smaller matrices and amount of memory needed to store matrices. In addition, a smaller number of nodes and edges reduces the amount of computation needed to apply or train a neural network. Less nodes means less activation values need be computed, and/or less derivative values need be computed during training.

Properties of matrices used to implement a neural network correspond neurons and edges. A cell in a matrix W represents a particular edge from a node in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake a I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptrons (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as explained above.

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Autoencoder implementation and integration techniques are taught in related U.S. patent application Ser. No. 14/558,700, entitled "AUTO-ENCODER ENHANCED SELF-DIAGNOSTIC COMPONENTS FOR MODEL MONITORING". That patent application elevates a supervised or unsupervised ANN model as a first class object that is amenable to management techniques such as monitoring and governance during model development such as during training.

Deep Context Overview

As described above, an ANN may be stateless such that timing of activation is more or less irrelevant to ANN behavior. For example, recognizing a particular letter may occur in isolation and without context. More complicated classifications may be more or less dependent upon additional contextual information. For example, the information content (i.e. complexity) of a momentary input may be less than the information content of the surrounding context. Thus, semantics may occur based on context, such as a temporal sequence across inputs or an extended pattern (e.g. compound geometry) within an input example. Various techniques have emerged that make deep learning be contextual. One general strategy is contextual encoding, which packs a stimulus input and its context (i.e. surrounding/related details) into a same (e.g. densely) encoded unit that may be applied to an ANN for analysis. One form of contextual encoding is graph embedding, which constructs and prunes (i.e. limits the extent of) a logical graph of (e.g. temporally or semantically) related events or records. The graph embedding may be used as a contextual encoding and input stimulus to an ANN.

Hidden state (i.e. memory) is a powerful ANN enhancement for (especially temporal) sequence processing. Sequencing may facilitate prediction and operational anomaly detection, which can be important techniques. A recurrent neural network (RNN) is a stateful MLP that is arranged in topological steps that may operate more or less as stages of a processing pipeline. In a folded/rolled embodiment, all of the steps have identical connection weights and may share a single one dimensional weight vector for all steps. In a recursive embodiment, there is only one step that recycles some of its output back into the one step to recursively achieve sequencing. In an unrolled/unfolded embodiment, each step may have distinct connection weights. For example, the weights of each step may occur in a respective column of a two dimensional weight matrix.

A sequence of inputs may be simultaneously or sequentially applied to respective steps of an RNN to cause analysis of the whole sequence. For each input in the sequence, the RNN predicts a next sequential input based on all previous inputs in the sequence. An RNN may predict or otherwise output almost all of the input sequence already received and also a next sequential input not yet received. Prediction of a next input by itself may be valuable. Comparison of a predicted sequence to an actually received (and applied) sequence may facilitate anomaly detection. For example, an RNN based spelling model may predict that a U follows a Q while reading a word letter by letter. If a letter actually following the Q is not a U as expected, then an anomaly is detected.

Unlike a neural layer that is composed of individual neurons, each recurrence step of an RNN may be an MLP that is composed of cells, with each cell containing a few specially arranged neurons. An RNN cell operates as a unit of memory. An RNN cell may be implemented by a long short term memory (LSTM) cell. The way LSTM arranges neurons is different from how transistors are arranged in a flip flop, but a same theme of a few control gates that are specially arranged to be stateful is a goal shared by LSTM and digital logic. For example, a neural memory cell may have an input gate, an output gate, and a forget (i.e. reset) gate. Unlike a binary circuit, the input and output gates may conduct an (e.g. unit normalized) numeric value that is retained by the cell, also as a numeric value.

An RNN has two major internal enhancements over other MLPs. The first is localized memory cells such as LSTM, which involves microscopic details. The other is cross activation of recurrence steps, which is macroscopic (i.e. gross topology). Each step receives two inputs and outputs two outputs. One input is external activation from an item in an input sequence. The other input is an output of the adjacent previous step that may embed details from some or all previous steps, which achieves sequential history (i.e. temporal context). The other output is a predicted next item in the sequence. Example mathematical formulae and techniques for RNNs and LSTM are taught in related U.S. patent application Ser. No. 15/347,501, entitled "MEMORY CELL UNIT AND RECURRENT NEURAL NETWORK INCLUDING MULTIPLE MEMORY CELL UNITS."

Sophisticated analysis may be achieved by a so-called stack of MLPs. An example stack may sandwich an RNN between an upstream encoder ANN and a downstream decoder ANN, either or both of which may be an autoencoder. The stack may have fan-in and/or fan-out between MLPs. For example, an RNN may directly activate two downstream ANNs, such as an anomaly detector and an autodecoder. The autodecoder might be present only during model training for purposes such as visibility for monitoring training or in a feedback loop for unsupervised training. RNN model training may use backpropagation through time, which is a technique that may achieve higher accuracy for an RNN model than with ordinary backpropagation. Example mathematical formulae, pseudocode, and techniques for training RNN models using backpropagation through time are taught in related W.I.P.O. patent application No. PCT/US2017/033698, entitled "MEMORY-EFFICIENT BACK-PROPAGATION THROUGH TIME".

Software Overview

Figure 8:
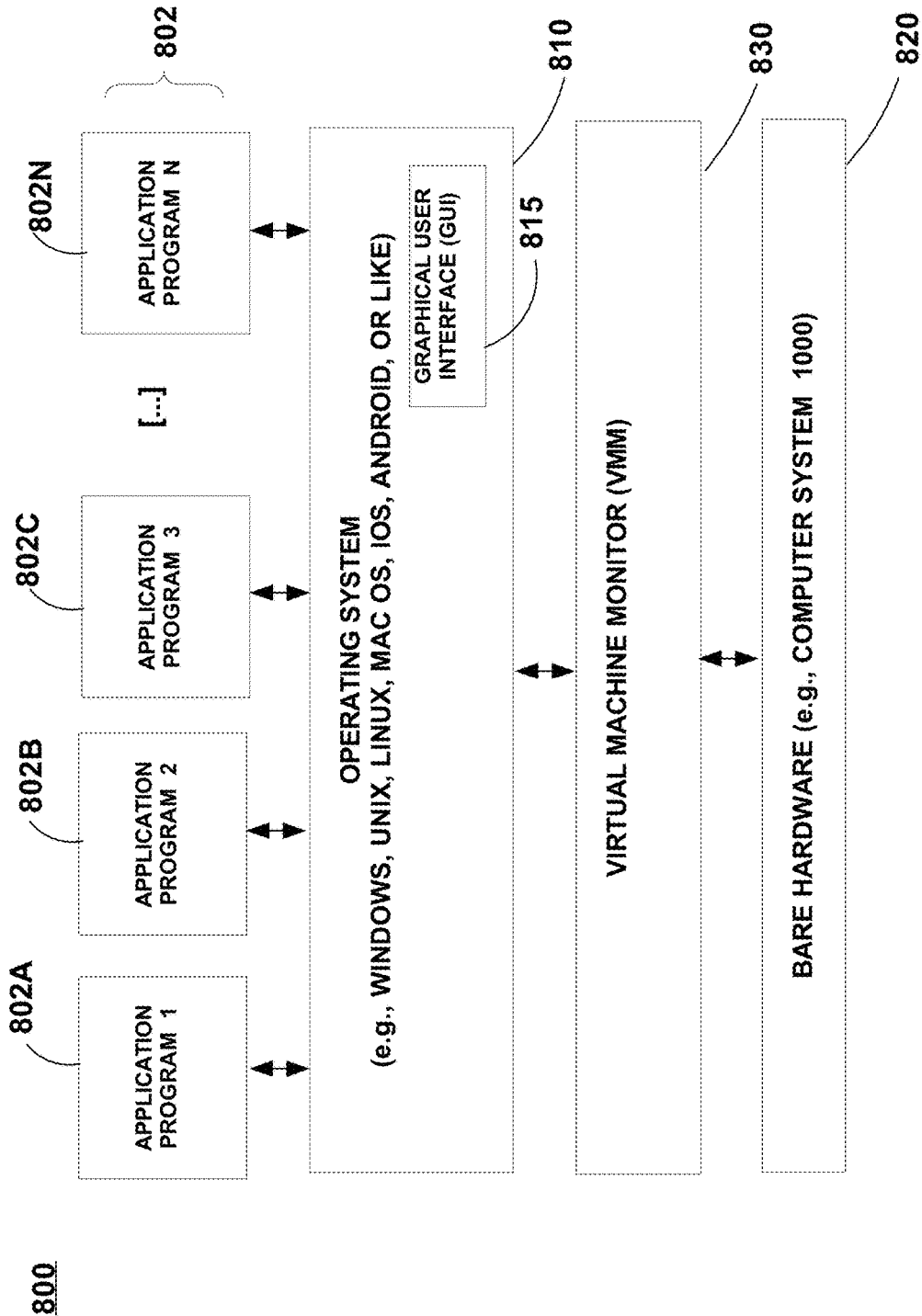
FIG. 8 is a diagram depicting a software system that may be used in an embodiment.
Figure 9:
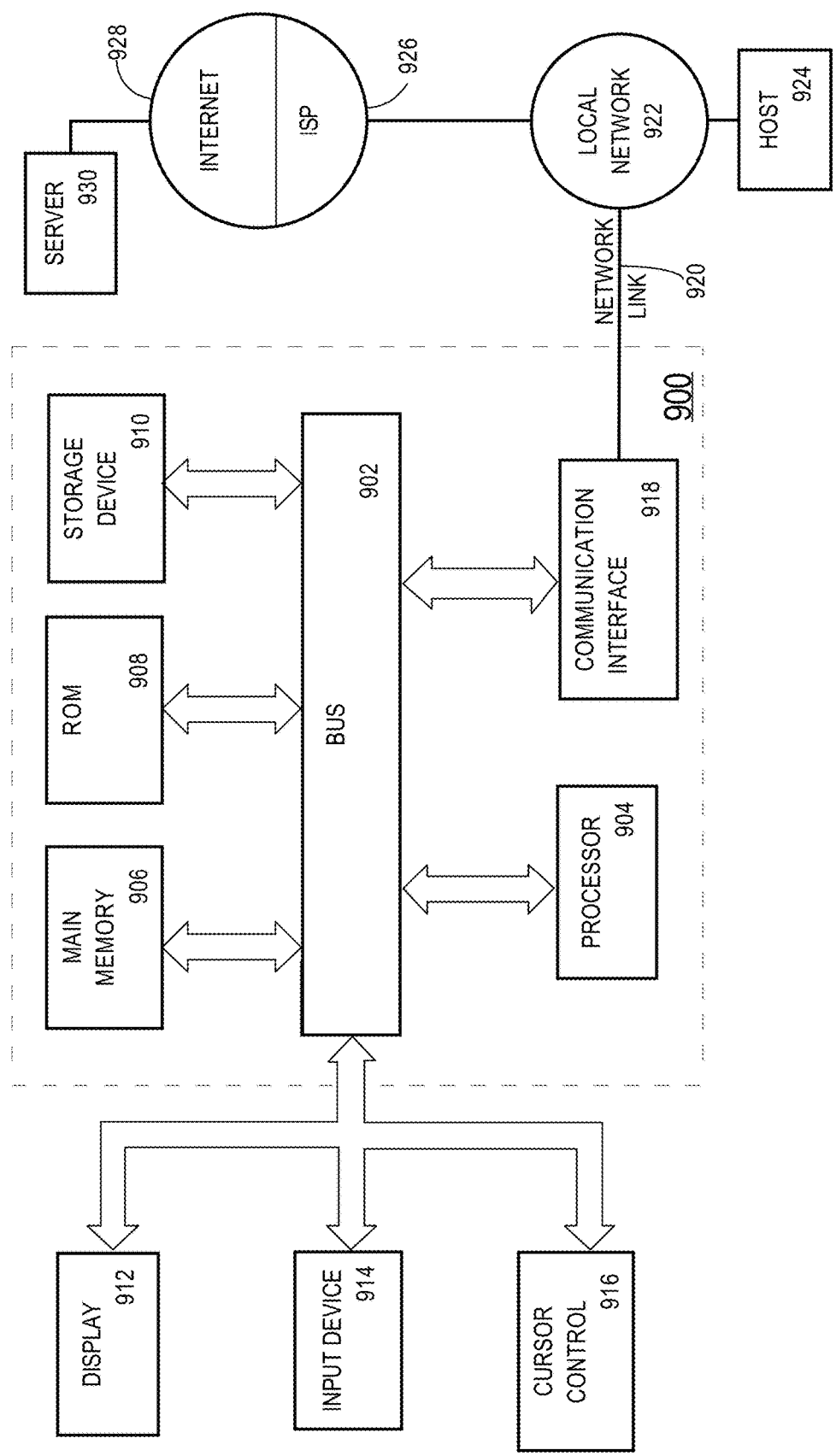
FIG. 9 is a diagram depicting a computer system that may be used in an embodiment.

FIG. 8 is a block diagram of a basic software system 800 that may be employed for controlling the operation of computing system 900 of FIG. 9. Software system 800 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 800 is provided for directing the operation of computing system 900. Software system 800, which may be stored in system memory (RAM) 906 and on fixed storage (e.g., hard disk or flash memory) 910, includes a kernel or operating system (OS) 810.

The OS 810 manages low-level aspects of computer operation, including managing execution of processes, memory allocation, file input and output (I/O), and device I/O. One or more application programs, represented as 802A, 802B, 802C . . . 802N, may be "loaded" (e.g., transferred from fixed storage 910 into memory 906) for execution by the system 800. The applications or other software intended for use on computer system 900 may also be stored as a set of downloadable computer-executable instructions, for example, for downloading and installation from an Internet location (e.g., a Web server, an app store, or other online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 904) of computer system 900. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the computer system 900.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system (OS) to run as if the guest OS is running on the bare hardware 820 of computer system 900 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Multiple threads may run within a process. Each thread also comprises an allotment of hardware processing time but share access to the memory allotted to the process. The memory is used to store content of processors between the allotments when the thread is not running. The term thread may also be used to refer to a computer system process in multiple threads are not running.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or solid-state drive is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for predicting multivariate time-series data and identifying anomalies in the time-series data, comprising:
    receiving input data for a disk drive, wherein the input data comprises time-stamped sensor attribute values from sensors monitoring the disk drive;
    automatically preprocessing the input data to generate one or more enhanced feature sequences, said one or more enhanced feature sequences including values generated by applying statistical functions to said input data;
    wherein said preprocessing the input data comprises applying a set of one or more enhance functions on the input data, said applying comprising:
        generating, using a pre-specified value of an enhancement-factor parameter, a set of moving window averages from the input data; and
        concatenating the input data and the set of moving window averages to generate one or more enhanced feature sequences;
    providing the one or more enhanced feature sequences to a trained machine learning model; and
    receiving, from the trained machine learning model, predictions regarding impending failures in the disk drive in threshold period of time in the future;
    wherein the method is performed by one or more computing devices.

2. The method of claim 1, wherein generating, using the pre-specified value of the enhancement-factor parameter, the set of moving window averages from the input data comprises:
    applying the set of one or more enhance functions on the input data multiple times using different window sizes based on: a sequence length of a sample of the input data, and the pre-specified value of the enhancement-factor parameter.

3. The method of claim 1, wherein, prior to providing the one or more enhanced feature sequences to a trained machine learning model, the method further comprises:
    performing a plurality of training phases, wherein each of the plurality of training phases comprises training the machine learning model using each of a corresponding plurality of enhanced feature sequence training data sets;

evaluating the machine learning model being trained on each of the corresponding plurality of enhanced feature sequence training data sets using a set of test data and validation data; and establishing the trained machine learning model for predicting disk drive failures based on results from using the set of test data and validation data.

4. The method of claim 3, wherein prior to performing the plurality of training phases, receiving values for a set of preprocessing parameters, the set of preprocessing parameters comprising:
a heads-up-period parameter;
an enhancement-factor parameter;
a failure-time parameter; and
a healthy/failed ratio.

5. The method of claim 3, wherein prior to performing the plurality of training phases, the machine learning model is tuned using a set of pre-specified hyper-parameters.

6. The method of claim 3, wherein the machine learning model is a recurrent neural network long short-term memory model.

7. The method of claim 4, wherein each of the corresponding plurality of enhanced feature sequence training data sets is generated by:
receiving one or more training data sets corresponding to time-stamped sensor attribute values for one or more sensors monitoring one or more disk drives; and
preprocessing the one or more training data sets corresponding to time-stamped sensor attribute values to generate each of one or more enhanced feature sequence training data sets.

8. The method of claim 7, wherein preprocessing the one or more training data sets comprises:
establishing a time-stamp for a last valid sample in the one or more training data sets based on values for the failure-time parameter and the heads-up-period parameter, wherein the time-stamp, L, for the last valid sample, is given by L=failure-time−heads-up-period; and generating, from the one or more training data sets, a set of first sample training sequences by limiting the one or more training data sets to only those data sets that are dated less than the time-stamp for the last valid sample, L.

9. The method of claim 8, wherein preprocessing the one or more training data sets further comprises selecting, from the set of first sample training sequences, a set of second sample training sequences based on the healthy/failed ratio, wherein the set of second sample training sequences prevent class imbalance in a selection of sensor attribute data from healthy disks and failed disks in the one or more training data sets.

10. The method of claim 9, wherein preprocessing the one or more training data sets further comprises:
using the pre-specified value of the enhancement-factor parameter to generate a set of moving window averages from a second set of sample sequences; and
concatenating the second set of sample sequences and the set of moving averages to generate the corresponding plurality of enhanced feature sequence training data sets for training the machine learning model.

11. One or more non-transitory storage media storing sequences of instructions which, when executed by one or more processors, cause:

receiving input data for a disk drive, wherein the input data comprises time-stamped sensor attribute values from sensors monitoring the disk drive;
automatically preprocessing the input data to generate one or more enhanced feature sequences, said one or more enhanced feature sequences including values generated by applying statistical functions to said input data;
wherein said preprocessing the input data comprises applying a set of one or more enhance functions on the input data, said applying comprising:
generating, using a pre-specified value of an enhancement-factor parameter, a set of moving window averages from the input data; and
concatenating the input data and the set of moving window averages to generate one or more enhanced feature sequences;
providing the one or more enhanced feature sequences to a trained machine learning model; and
receiving, from the trained machine learning model, predictions regarding impending failures in the disk drive in threshold period of time in the future.

12. The one or more non-transitory storage media of claim 11, wherein generating, using the pre-specified value of the enhancement-factor parameter, the set of moving window averages from the input data comprises:
applying the set of one or more enhance functions on the input data multiple times using different window sizes based on: a sequence length of a sample of the input data, and the pre-specified value of the enhancement-factor parameter.

13. The one or more non-transitory storage media of claim 11, wherein the sequences of instructions include instructions that, when executed by one or more processors, cause prior to providing the one or more enhanced feature sequences to a trained machine learning model:
performing a plurality of training phases, wherein each of the plurality of training phases comprises training the machine learning model using each of a corresponding plurality of enhanced feature sequence training data sets;
evaluating the machine learning model being trained on each of the corresponding plurality of enhanced feature sequence training data sets using a set of test data and validation data; and
establishing the trained machine learning model for predicting disk drive failures based on results from using the set of test data and validation data.

14. The one or more non-transitory storage media of claim 13, wherein the sequences of instructions include instructions that, when executed by one or more processors, cause prior to performing the plurality of training phases, receiving values for a set of preprocessing parameters, the set of preprocessing parameters comprising:
a heads-up-period parameter;
an enhancement-factor parameter;
a failure-time parameter; and
a healthy/failed ratio.

15. The one or more non-transitory storage media of claim 13, wherein the sequences of instructions include instructions that, when executed by one or more processors, cause prior to performing the plurality of training phases, the machine learning model is tuned using a set of pre-specified hyper-parameters.

16. The one or more non-transitory storage media of claim 13, wherein the machine learning model is a recurrent neural network long short-term memory model.

17. The one or more non-transitory storage media of claim 14, wherein the sequences of instructions include instructions that, when executed by one or more processors, cause each of the corresponding plurality of enhanced feature sequence training data sets is generated by:
    receiving one or more training data sets corresponding to time-stamped sensor attribute values for one or more sensors monitoring one or more disk drives; and
    preprocessing the one or more training data sets corresponding to time-stamped sensor attribute values to generate each of one or more enhanced feature sequence training data sets.

18. The one or more non-transitory storage media of claim 17, wherein preprocessing the one or more training data sets comprises:
    establishing a time-stamp for a last valid sample in the one or more training data sets based on values for the failure-time parameter and the heads-up-period parameter, wherein the time-stamp, L, for the last valid sample, is given by L=failure-time−heads-up-period; and generating, from the one or more training data sets, a set of first sample training sequences by limiting the one or more training data sets to only those data sets that are dated less than the time-stamp for the last valid sample, L.

19. The one or more non-transitory storage media of claim 18, wherein preprocessing the one or more training data sets further comprises selecting, from the set of first sample training sequences, a set of second sample training sequences based on the healthy/failed ratio, wherein the set of second sample training sequences prevent class imbalance in the selection of sensor attribute data from healthy disks and failed disks in the one or more training data sets.

20. The one or more non-transitory storage media of claim 19, wherein preprocessing the one or more training data sets further comprises:
    using the pre-specified value of the enhancement-factor parameter to generate a set of moving window averages from a second set of sample sequences; and
    concatenating the second set of sample sequences and the set of moving averages to generate the corresponding plurality of enhanced feature sequence training data sets for training the machine learning model.

\* \* \* \* \*

UNITED STATES PATENT AND TRADEMARK OFFICE
CERTIFICATE OF CORRECTION

PATENT NO. : 11,579,951 B2
APPLICATION NO. : 16/144912
DATED : February 14, 2023
INVENTOR(S) : Kocberber et al.

It is certified that error appears in the above-identified patent and that said Letters Patent is hereby corrected as shown below:

On the Title Page

On page 3, Column 1, under Other Publications, Line 8, delete "ARIMA" and insert -- ARMA --, therefor.

On page 3, Column 1, under Other Publications, Line 21, delete "Doftware" and insert -- Software --, therefor.

On page 3, Column 2, under Other Publications, Line 66, delete "Proprocessing" and insert -- Preprocessing --, therefor.

On page 4, Column 1, under Other Publications, Line 2, delete "Artifical" and insert -- Artificial --, therefor.

In the Specification

In Column 1, Line 28, after "conditions" insert -- . --, therefor.

In Column 11, Line 1, delete "LTSM" and insert -- LSTM --, therefor.

In Column 14, Line 57, delete "and or" and insert -- and/or --, therefor.

In the Claims

In Column 26, Line 11, in Claim 19, delete "the" and insert -- a --, therefor.

Signed and Sealed this
Nineteenth Day of December, 2023

Katherine Kelly Vidal
*Director of the United States Patent and Trademark Office*